(12) United States Patent
Silva Rubio et al.

(10) Patent No.: US 9,873,285 B2
(45) Date of Patent: Jan. 23, 2018

(54) SUPPORT RING FOR WRITING INSTRUMENTS ON VERTICAL SURFACES

(71) Applicant: NOZALA, S.A.P.I. de C.V., México, D.F. (MX)

(72) Inventors: Miguel Angel Silva Rubio, México (MX); Ernesto Hernandez Vázquez, México (MX)

(73) Assignee: NOZALA, S.A.P.I. DE C.V., México, D.F. (MX)

( * ) Notice: Subject to any disclaimer, the term of this patent is extended or adjusted under 35 U.S.C. 154(b) by 0 days.

(21) Appl. No.: 15/230,709

(22) Filed: Aug. 8, 2016

(65) Prior Publication Data

US 2017/0225505 A1    Aug. 10, 2017

(51) Int. Cl.
| F16B 47/00 | (2006.01) |
| B43K 23/00 | (2006.01) |
| F16M 13/02 | (2006.01) |

(52) U.S. Cl.
CPC ............ B43K 23/001 (2013.01); F16B 47/00 (2013.01); F16M 13/022 (2013.01)

(58) Field of Classification Search
USPC ...................................................... 248/206.2
See application file for complete search history.

(56) References Cited

U.S. PATENT DOCUMENTS

| 67,120 | A | * | 7/1867 | Jedamski | ............. | B43K 23/001 |
| | | | | | | 131/240.1 |
| 1,743,694 | A | * | 1/1930 | Tierney | ................... | B60R 13/00 |
| | | | | | | 131/256 |
| 1,845,196 | A | * | 2/1932 | Schaff | ................ | A47G 23/0225 |
| | | | | | | 24/326 |
| 2,139,805 | A | * | 12/1938 | Chase | ....................... | G01K 1/14 |
| | | | | | | 248/205.5 |
| 2,202,242 | A | * | 5/1940 | Wortham | ............... | A47G 29/08 |
| | | | | | | 248/205.5 |
| 2,297,806 | A | * | 10/1942 | Smith | .......................... | 131/256 |
| 2,558,978 | A | * | 7/1951 | Pettit | ..................... | A61J 9/0684 |
| | | | | | | 248/106 |
| 2,594,955 | A | * | 4/1952 | Markowitz | .......... | B43K 23/001 |
| | | | | | | 131/257 |
| 2,964,812 | A | * | 12/1960 | Cook | ................... | B43K 25/024 |
| | | | | | | 239/DIG. 10 |
| 3,216,687 | A | * | 11/1965 | Vardan | .................. | A61J 9/0638 |
| | | | | | | 248/103 |
| 4,867,402 | A | * | 9/1989 | Benson | .................. | A47G 29/08 |
| | | | | | | 248/206.3 |
| 4,991,806 | A | * | 2/1991 | Nakamura | ............... | A47G 1/17 |
| | | | | | | 248/206.2 |
| D322,554 | S | * | 12/1991 | Amussen | ...................... | D8/373 |
| D349,924 | S | * | 8/1994 | Fisch | ........................... | D11/166 |
| 5,356,102 | A | * | 10/1994 | Blumenaus | ............. | F16B 47/00 |
| | | | | | | 248/205.5 |
| D377,193 | S | * | 1/1997 | Takemura | .................... | D19/135 |
| 5,592,244 | A | * | 1/1997 | Vyhmeister | ............. | A47F 7/021 |
| | | | | | | 248/309.1 |

(Continued)

*Primary Examiner* — Monica Millner
(74) *Attorney, Agent, or Firm* — Egbert Law Offices, PLLC

(57) ABSTRACT

A device is provided for supporting writing instruments on vertical surfaces such as boards or flip charts. The device has a ring where the writing instrument is inserted and means of adhesion the vertical surface.

4 Claims, 6 Drawing Sheets

(56) References Cited

U.S. PATENT DOCUMENTS

| | | | | |
|---|---|---|---|---|
| 5,816,547 | A * | 10/1998 | Croft | B42D 3/12 |
| | | | | 248/205.5 |
| D419,808 | S * | 2/2000 | Hampshire | D3/304 |
| 6,131,865 | A * | 10/2000 | Adams | A47G 1/17 |
| | | | | 248/205.5 |
| 6,142,432 | A * | 11/2000 | Amussen | B43K 23/02 |
| | | | | 248/205.5 |
| 6,155,469 | A * | 12/2000 | Johnson | B60R 11/00 |
| | | | | 108/44 |
| 6,305,864 | B1 * | 10/2001 | Nguyen | B43K 23/04 |
| | | | | 15/435 |
| 6,405,983 | B1 * | 6/2002 | Goj | A47G 1/17 |
| | | | | 248/205.1 |
| D496,068 | S * | 9/2004 | Mandel | D19/113 |
| 6,869,053 | B2 * | 3/2005 | Adams, IV | F16B 47/00 |
| | | | | 248/206.2 |
| 7,219,869 | B1 * | 5/2007 | Whittington | B43K 23/002 |
| | | | | 224/191 |
| 8,439,585 | B2 * | 5/2013 | Silva Rubio | B43K 23/002 |
| | | | | 206/214 |
| 8,480,045 | B2 * | 7/2013 | Adams, IV | F16B 45/00 |
| | | | | 248/205.5 |
| D765,662 | S * | 9/2016 | Kang | D14/251 |
| 2002/0146272 | A1 * | 10/2002 | Conover | B43K 23/02 |
| | | | | 401/131 |
| 2012/0286113 | A1 * | 11/2012 | Chen | F16B 47/00 |
| | | | | 248/206.2 |

* cited by examiner

SUPPORT RING FOR WRITING INSTRUMENTS ON VERTICAL SURFACES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention refers to a ring of writing instruments like markers, nibs, feathers, or similar on vertical surfaces.

2. Description of Related Art Including Information Disclosed Under 37 CFR 1.97 and 37 CFR 1.98

Normally writing instruments are deposited in desktop container designed to contain these instruments in an upright position and have them available, however when these writing instruments must be available for writing on a vertical surface, such as a chalkboard or a control sheet, for the control of service or personnel who access a particular area, it is necessary to hold the writing instrument by means of a cord or string instrument and place the instrument on a stand or container attached to the vertical surface. In other cases, it is placed a horizontal surface next to the site of writing, such as a desk or a duct for the support of writing instrument. This type of solution implies that the user holds the instrument, bound or attached to a cord or chain, lean over and take the instrument of the vertical surface, which is not always comfortable.

There are different solutions in the prior art to support instruments on horizontal surfaces, considering that the user would not have any difficulty in accessing the writing instruments assuming that it is carried out on a horizontal surface, or when this should be done on a vertical surface is enough to tie the writing instrument or put a container on a vertical surface.

It would be plausible to have a support of writing instrument when writing on a vertical surface, allowing you to easily and quickly without having to divert attention, the look, the head or tip body to locate and take the writing instrument, also place and move the support at any height on the vertical surface.

The above advantages of a vertical support is welcome for those users requiring to write on surfaces that are vertical, such as blackboards, broken vertical pages, control sheets available on walls, or similar.

The present invention provides effectively a ring to support writing instruments, such as markers, nibs, pens or similar, attachment to vertical surfaces for easy repositioning.

BRIEF SUMMARY OF THE INVENTION

The present invention provides a ring for the support of writing instruments in vertical surfaces, like markers, pens, nibs or similar comprising a ring of support of the writing instrument and a means of support ring and reversible adhesion to the vertical surface, on average of accession.

The ring clamp and support of the writing instrument, or ring, has the shape and adequate dimensions to support writing instruments with a diameter as large as markers for boards or smaller diameter to fasten nibs or feathers, even to hold instruments of polygonal shape.

DETAILED DESCRIPTION OF THE INVENTION

The present invention provides a ring for supporting writing instruments on vertical surfaces which comprises means for reversible attachment to the vertical surface.

Referring to the above figures, the ring contains a top surface SS; a lower surface SI; a side surface contained between the upper surface and the lower surface; SC first circular section, which is suitable for inserting and supporting the writing instrument; a second rectangular section SR, which includes a curved slot which covers between 50% and 75% of the lateral surface. The curved slot allows the coupling ring with adhesion means. The ring can have a variable circumference depending on diameter of the writing instrument to hold, this is between 7 mm and 25 mm.

The means of adhesion, this type being a suction cup, covers an area of contact, Sc, with the vertical surface. A concave cup, Co, allows adhesion to the vertical surface by the vacuum that causes pressing the means adhesion against the vertical surface. A solid neck, Cu, attaches the curved slot ring, RC. A top flange limits the solid neck, which also serves to press and hold the ring.

The ring assembly with means of adhesion occurs when you insert the curved slot, RC, ring in the neck solid, Cu, of the means of adhesion. The ring is subjected as well between the upper flange, Rs, and the cup, Co, in the means of adhesion.

The assembly ring and adhesion means adheres to the wall by placing the surface of contact, Sc, of the means of adhesion against the surface vertically and hold top flange to expel all the air contained in the cup, Co.

Figure 1:
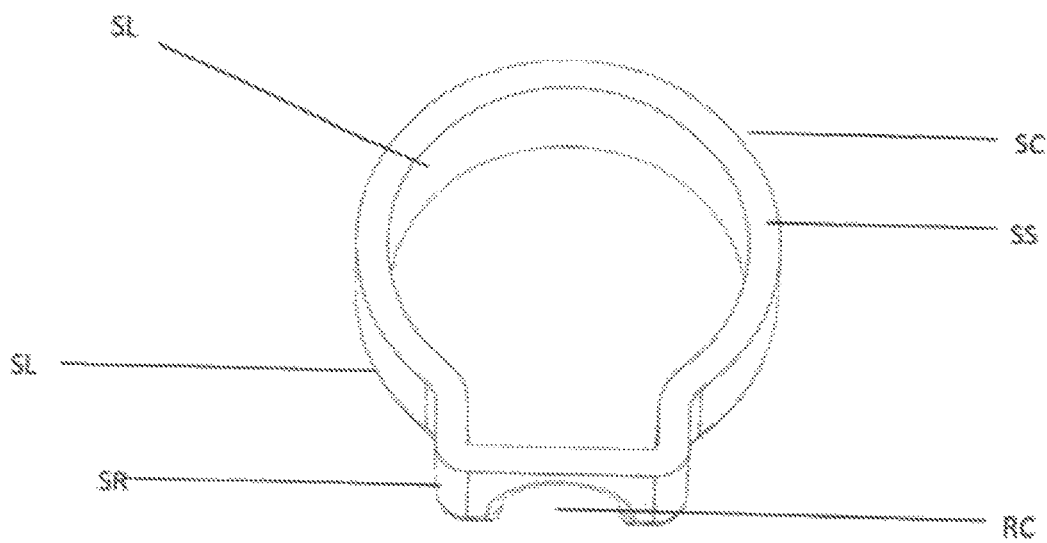
FIG. 1 shows the ring of the present invention having: SC circular; SR rectangular section; SS top surface; If bottom surface: SL lateral surface and RC slot curve.
Figure 2:
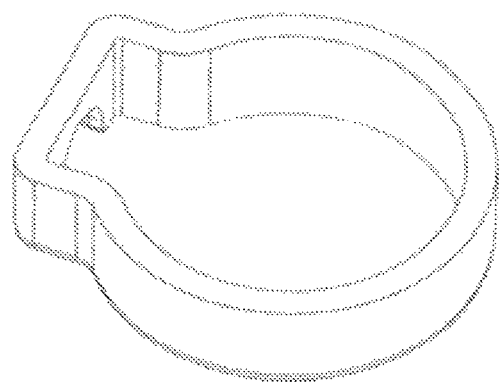
FIG. 2 shows a top view of the ring.
Figure 3:
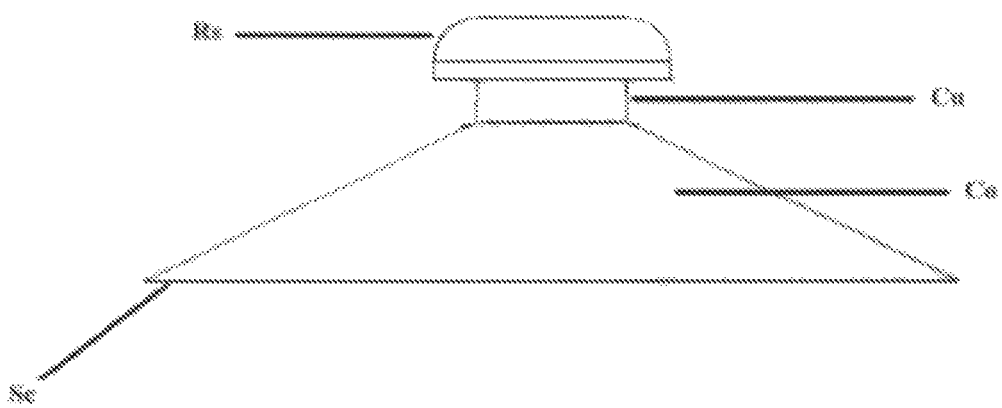
FIG. 3 shows the middle of adhesion, type "suction cup", where Sc contacts on the vertical surface; Co suction cup; CU neck support ring and Rs top flange.
Figure 4:
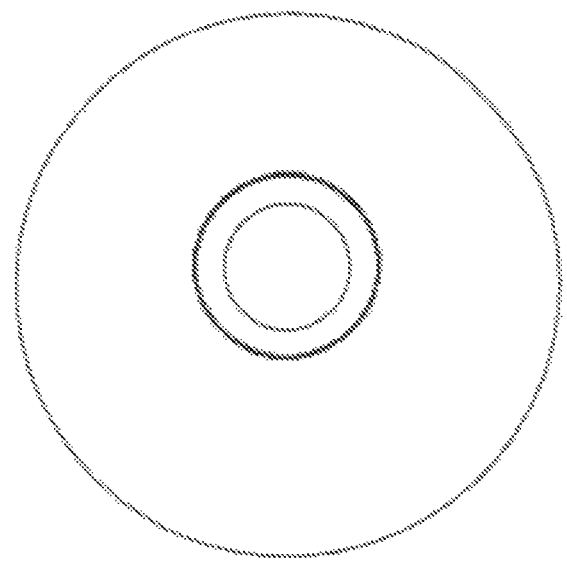
FIG. 4 shows a front view of the device of the adhesion method.
Figure 5:
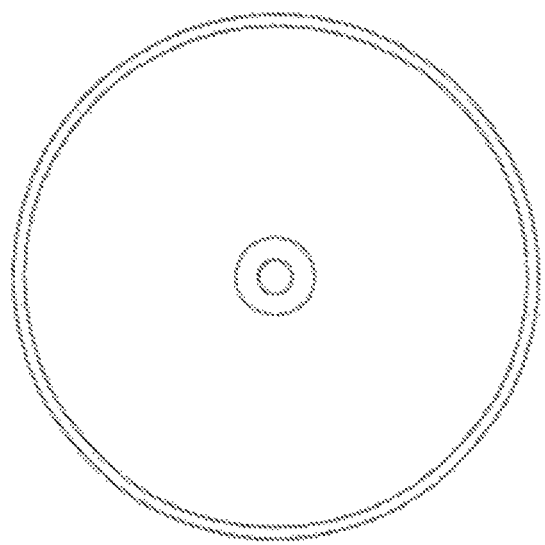
FIG. 5 shows a rear view of the device of the adhesion method.
Figure 6:
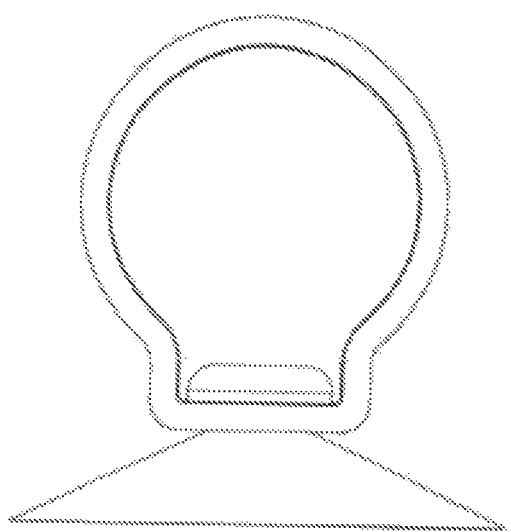
FIG. 6 shows a top view of the ring assembly and adhesion method.
Figure 7:
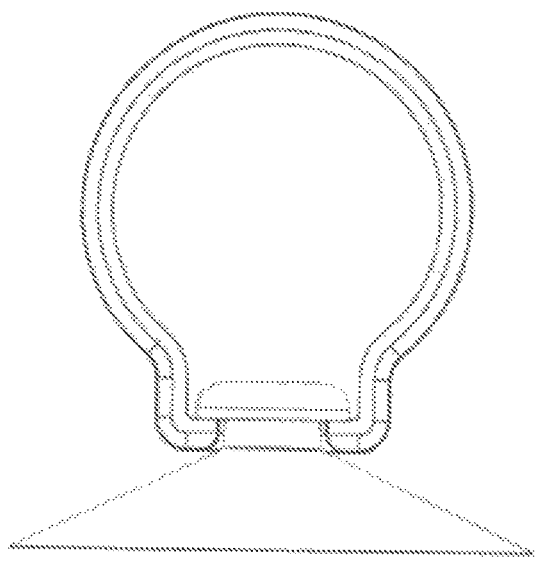
FIG. 7 shows a bottom view of the ring assembly and adhesion method.
Figure 8:
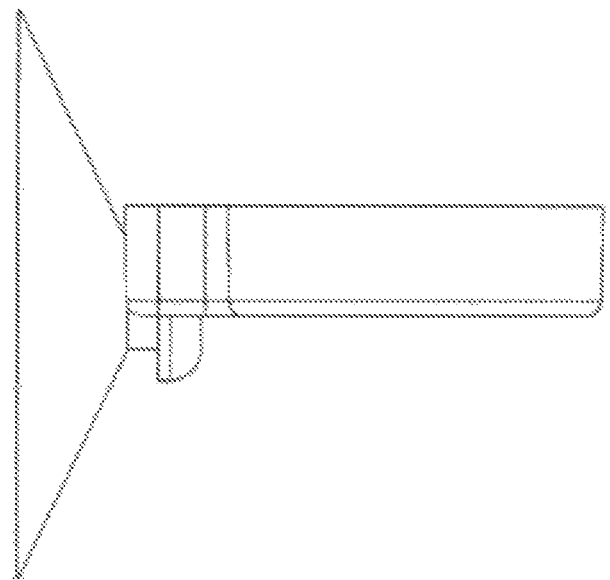
FIG. 8 shows a side view of the ring assembly and adhesion method.
Figure 9:
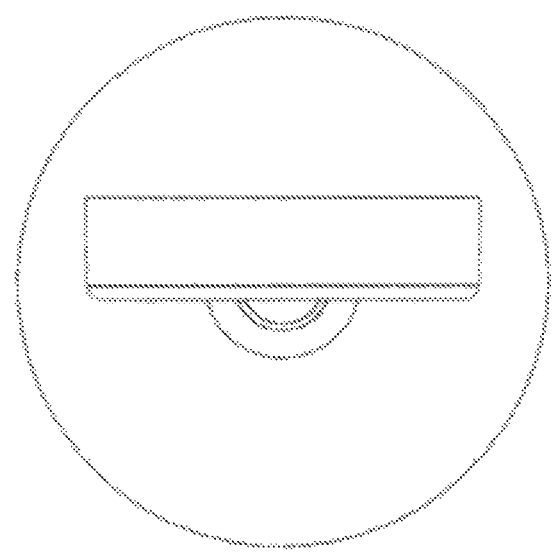
FIG. 9 shows a front view of the ring assembly and adhesion method.
Figure 10:
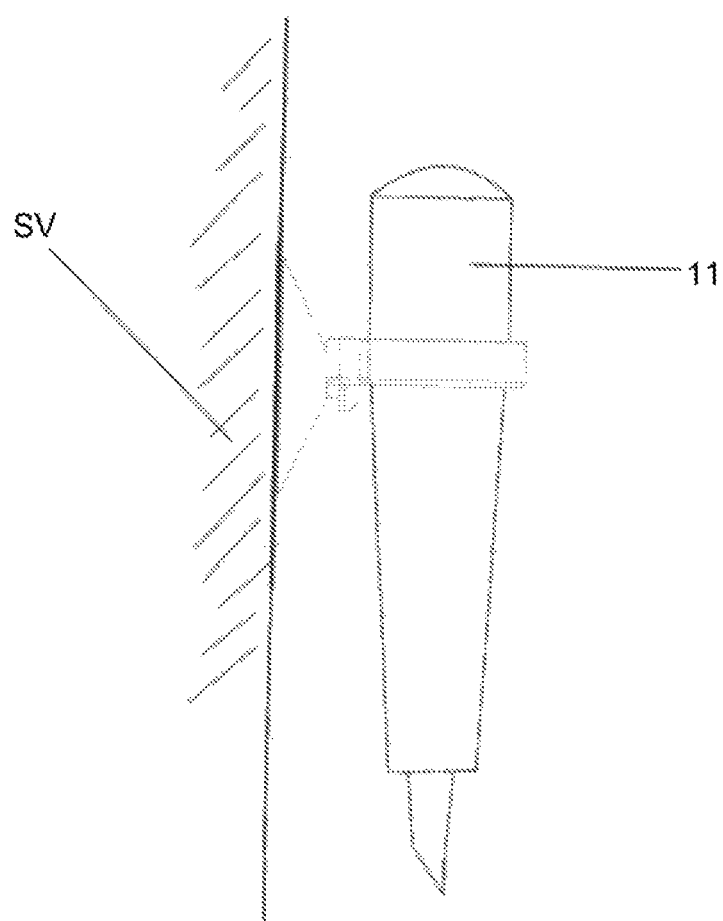
FIG. 10 shows a side view of the ring assembly, the middle of accession and attached writing instrument IE attached to the vertical surface Sv.

The writing instrument is placed inside the ring, as shown in FIG. 10.

For the repositioning of the ring and the means of adhesion on the surface or to remove it, simply hold the union of the ring and the means of adhesion and pull to pull it away from the surface.

We claim:

1. An assembly for supporting a writing instrument on a vertical surface, the assembly comprising:

a support ring having an inner wall adapted to bear against the writing instrument, said inner wall having a substantially circular portion, said support ring having a rectangular section extending outwardly of the substantially circular portion, said rectangular section having an inner wall contiguous with said inner wall of said support ring and an outer wall contiguous with an outer wall of said support ring, said rectangular section having a curved slot formed therein, said support ring adapted to surround an outer diameter of the writing instrument when the writing instrument is received in an interior of said support ring; and a suction cup having a contact surface adapted to adhere to the vertical surface, said suction cup having a concave cup extending from said contact surface and a neck extruding outwardly from a side of said concave support opposite said contact surface, and suction cup having a rim at an end of said neck opposite said concave cup, said rim having a diameter greater than a diameter of said neck, said curved slot receiving said neck therein such that said support ring extends in transverse relation to a plane of said contact surface.

2. The assembly of claim 1, said support ring having a top surface and a lower surface and a side surface between said top surface and said lower surface.

3. The assembly of claim 1, said curved slot spanning between 50% and 75% of a lateral surface area of said rectangular section.

4. The assembly of claim 1, said substantially circular configuration of said support ring having a diameter of between 7 millimeters and 25 millimeters.

\* \* \* \* \*